US012681770B2

(12) United States Patent
Wang et al.

(10) Patent No.: US 12,681,770 B2
(45) Date of Patent: Jul. 14, 2026

(54) MANAGING DISTRIBUTED PROCESSES

(71) Applicant: International Business Machines Corporation, Armonk, NY (US)

(72) Inventors: Jin Wang, Xian (CN); Lei Gao, Xian (CN); A Peng Zhang, Xian (CN); Xiang Zhen Gan, Xian (CN); Xian Wu, Xian (CN); Ke Du, Xian (CN)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 18/355,018

(22) Filed: Jul. 19, 2023

(65) Prior Publication Data

US 2025/0028571 A1     Jan. 23, 2025

(51) Int. Cl.
*G06F 9/50* (2006.01)

(52) U.S. Cl.
CPC ...... *G06F 9/5072* (2013.01); *G06F 2209/505* (2013.01)

(58) Field of Classification Search
CPC .. G06F 9/5072; G06F 2209/505; G06F 9/542; G06F 11/3006
See application file for complete search history.

(56) References Cited

U.S. PATENT DOCUMENTS

| | | | |
|---|---|---|---|
| 8,656,355 B2 | 2/2014 | Oberlin | |
| 2016/0117413 A1 | 4/2016 | Botea | |
| 2019/0026355 A1* | 1/2019 | Yano | G06F 8/74 |
| 2023/0229675 A1* | 7/2023 | Hautyunyan | H04L 43/024 |
| 2023/0393963 A1* | 12/2023 | Mangat | G06F 11/3612 |

FOREIGN PATENT DOCUMENTS

| | | |
|---|---|---|
| CN | 105389243 B | 6/2018 |
| CN | 105975384 B | 10/2018 |
| CN | 114691404 A | 7/2022 |
| WO | 0008806 A1 | 2/2000 |

OTHER PUBLICATIONS

Kurfess et al., "Monitoring Distributed Processes with Intelligent Agents", ResearchGate, Mar. 1999, 8 pages.
Zhang et al., "A Reliable Distributed Process Management System", 2008 International Symposium on Computer Science and Computational Technology, DOI 10.1109/ISCSCT.2008.248, pp. 724-728.

* cited by examiner

*Primary Examiner* — Sisley N Kim
(74) *Attorney, Agent, or Firm* — Gavin Giraud

(57) ABSTRACT

A computer-implemented method, program product, and systems for managing distributed processes is provided. Embodiments of the present invention define additional system parameters to a kernel using a union structure. Embodiments of the present invention can then process information manager kernel using a cluster model using a formed distance between one node of the plurality and another node of the plurality. Embodiments of the present invention can then control an interval for information collection and sorting frequency for each node of the plurality of nodes in the system.

20 Claims, 4 Drawing Sheets

100

300

START

302

PREDICT FREQUENCY

304

SORT FREQUENCY

306

UPDATE PROCESS

END

400

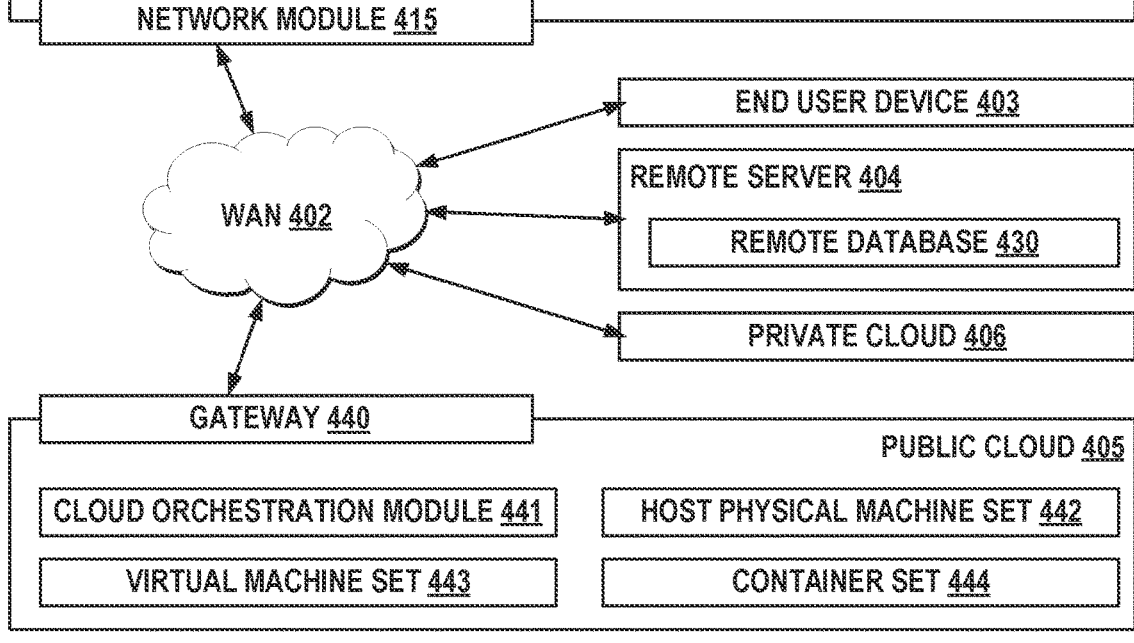

COMPUTER 401

PROCESSOR SET 410

PROCESSING CIRCUITRY 420    CACHE 421

COMMUNICATION FABRIC 411

VOLATILE MEMORY 412

PERSISTENT STORAGE 413

OPERATING SYSTEM 422

DISTRIBUTED PROCESS MANAGER

110

PERIPHERAL DEVICE SET 414

UI DEVICE SET 423    STORAGE 424    IoT SENSOR SET 425

NETWORK MODULE 415

WAN 402

END USER DEVICE 403

REMOTE SERVER 404

REMOTE DATABASE 430

PRIVATE CLOUD 406

GATEWAY 440

PUBLIC CLOUD 405

CLOUD ORCHESTRATION MODULE 441    HOST PHYSICAL MACHINE SET 442

VIRTUAL MACHINE SET 443    CONTAINER SET 444

FIG. 4

MANAGING DISTRIBUTED PROCESSES

BACKGROUND

The invention relates generally to distributed systems, and more specifically, to managing distributed systems.

Distributed processing typically refers to breaking up or otherwise splitting a task into functions. These separate functions are then dispersed across two or more interconnected processors. A distributed application refers to an application for which the component application programs are distributed between two or more interconnected processors while distributed data is data that is dispersed across two or more interconnected systems.

Distributing processing or distributed computing helps maximize performance by connecting users and information technology resources in a cost-effective, transparent, and reliable manner. Distributed processing can ensure fault tolerance and enables resource accessibility if one of the components fails. A distributed computing architecture typically includes several client machines with lightweight software agents installed with one or more dedicated distributed computing management servers. The agents running on the client machines usually detect when the machine is idle and notify the management server that the machine is not in use and is available for a processing job. The agents then request an application package. When the client machine receives this application package from the management server to process, it runs the application software when it has free central processing unit (CPU) cycles and sends the result back to the management server. When the user returns and requires the resources again, the management server returns the resources used to perform different tasks in the user's absence.

SUMMARY

According to one aspect of the present invention, a computer-implemented method, program product, and systems for managing distribute processes is provided, comprising: improving broadcast performance of a system that includes a plurality of nodes by defining additional system parameters to a kernel using a union structure; processing an information manager kernel thread using a cluster model using a formed distance between one node of the plurality and another node of the plurality; and controlling an interval for information collection and sorting frequency for each node of the plurality of nodes in the system.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Figure 1:
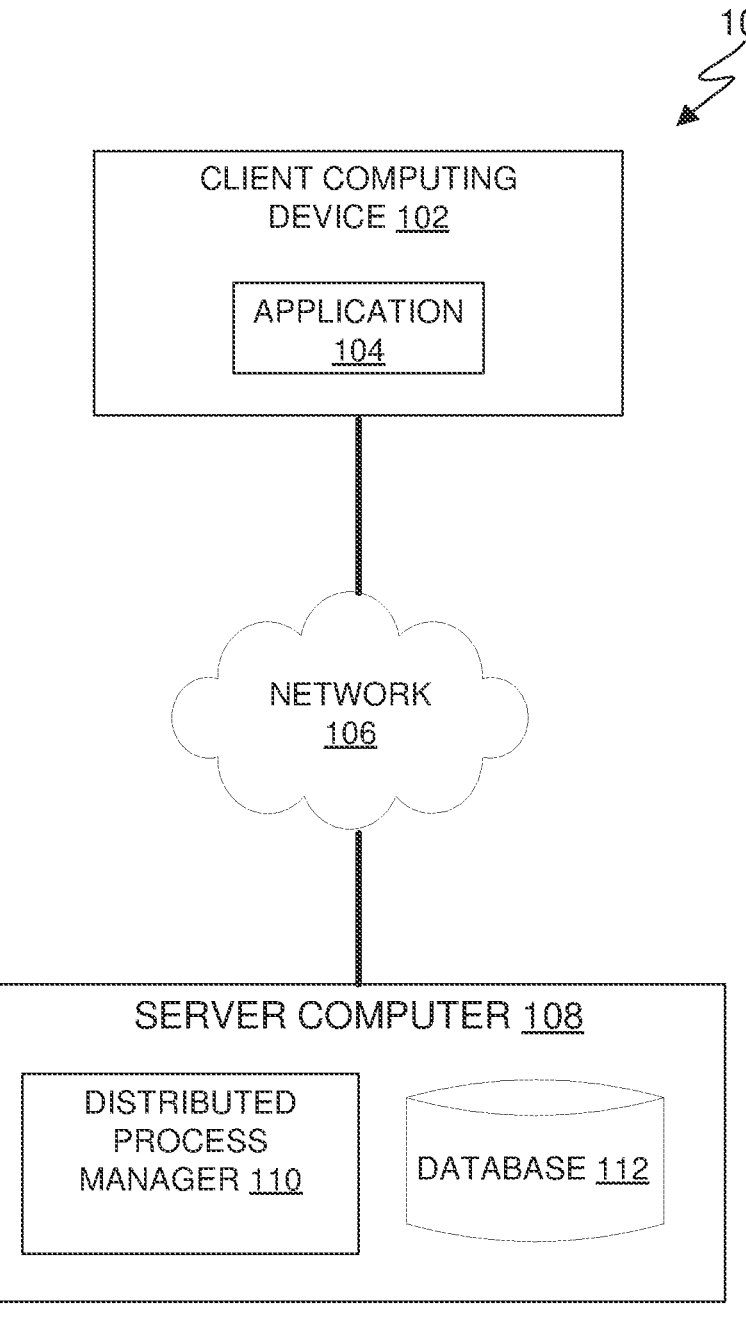
Figure 2:
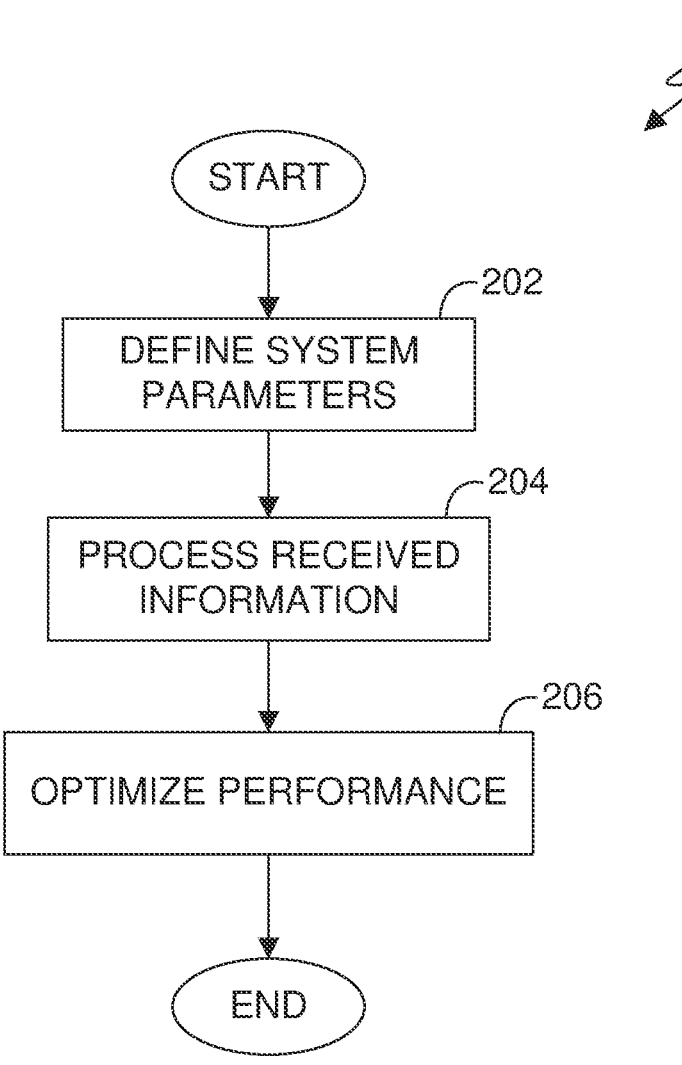
Figure 3:
Figure 3:
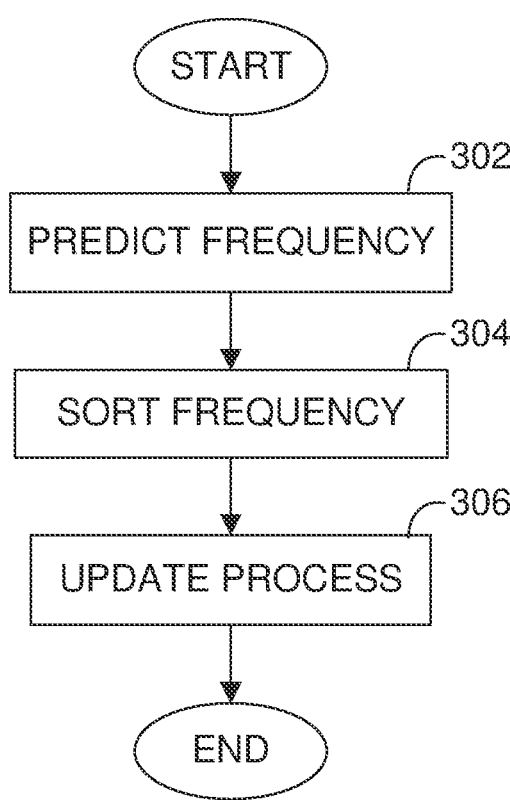

Preferred embodiments of the invention will be described, by way of example only, and with reference to the following drawings:

FIG. 1 shows a block diagram of a computing environment, in accordance with an embodiment of the present invention;

FIG. 2 is a flowchart depicting operational steps for managing distributed process, in accordance with an embodiment of the present invention;

FIG. 3 is a flowchart depicting operational steps for optimizing performance utilizing a union structure, in accordance with an embodiment of the present invention; and FIG. 4 shows a block diagram of an embodiment of a computing system comprising the authentication system according to FIG. 1.

DETAILED DESCRIPTION

Embodiments of the present invention recognize that distributed processing systems have become increasingly more complex. Embodiments of the present invention further recognize certain deficiencies in current distributed processing systems. For example, regardless of the complexity of distributed processing monitoring system, those systems typically run processes on different hosts and the system on each host can vary. Unix tools such as ps and pstree commands can only monitor and manage local processes. Embodiments of the present invention provide technical solutions that improve distributed processing systems. Specifically, embodiments of the present invention can manage distributed processes in different hosts in time. Embodiments of the present invention can further provide mechanisms to control information collection that avoids network traffic or avoids high system loads. As such embodiments of the present invention improve processing speeds of distributed processing systems and improves management of these systems by defining a union structure that manages distribute processes in different hosts, as discussed in greater detail, later in this Specification.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access distributed process manager 110 (e.g., using TCP/IP) to access and database and system information. Application 104 can further communicate with distributed process manager 110 to create a mechanism to manage distributed processes in different system hosts, as discussed in greater detail in FIGS. 2-3.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts distributed process manager 110 and database 112. In this embodiment, distributed process manager 110 resides on server computer 108. In other embodiments, distributed process manager 110 can have an instance of the program (not shown) stored locally on client computer device 102. In other embodiments, distributed process manager 110 can be a standalone program or system that can be integrated in one or more computing devices having a display screen.

Distributed process manager 110 improves broadcast performance of a system comprising a plurality of nodes by managing distributed processes using a union structure. This enhanced mechanism provides a decentralized method that operates directly on kernel (as opposed to one software module) that can be used to acquire and monitor remote host process information (e.g., each node can be monitored from another node and has entire information for use). In this embodiment, distributed process manager 110 manages distributed processes by defining one enhanced system by additional parameters to the kernel including Generic Process Identifier (GPID) and use this generic process identifier to filter and sort received information based on cluster and frequency. For example, distributed process manager 110 process an information manager kernel thread by cluster model with formed distance by association rule model. Distributed process manager 110 can then control the interval of information collection and sort the frequency in different nodes, map broadcast interval to from max to min value which is defined by user.

Broadcasts typically occurs after one interval for each node, but when one node receives the information from other nodes, (e.g., in response to receiving a new broadcast), embodiments of the present invention can determine whether the received information is in the same cluster. In response to determining the received information is in the same cluster, distributed process manager 110 can update local addresses such that each node includes the received information. In response to determining the received information is not in the same cluster, distributed process manager 110 can ignore the received information in favor for higher performance. In certain embodiments, distributed process manager 110 can use machine learning to reduce the additional performance cost in the network.

Database 112 stores received information and can be representative of one or more databases that give permissioned access to distributed process manager 110 or publicly available databases. For example, database 112 can store performance data, records, transactions, etc. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

FIG. 2 is a flowchart 200 depicting operational steps for managing distributed processes, in accordance with an embodiment of the present invention, in accordance with an embodiment of the present invention.

In step 202, distributed process manager 110 defines system parameters. In this embodiment, distributed process manager 110 defines system parameters to the kernel after receiving information. In this embodiment, information received includes system host information that can be stored on a table. For example, information received can include the system host, broadcast addresses, and a respective cluster identifier (ID) as shown below in Table 1. In other embodiments, distributed process manager 110 can collect system host information.

TABLE 1

| System Host Information | | |
|---|---|---|
| System Host | Broadcast Addresses | Cluster ID |
| HID 1 | BA 1 | CID 1 |
| HID 2 | BA 2 | CID 1 |
| . . . | . . . | . . . |
| N | N | N |

Distributed process manager 110 can then define or otherwise create a mechanism (i.e., a generic process identifier) using the received system host information. In this embodiment the generic process identifier includes a cluster ID, a host ID, and a process ID. A cluster ID is defined in the kernel parameters, with the default value being set to "one". The Host ID refers to an index number of the host in a host list while the process ID refers to the native Linux process ID. In this embodiment, distributed process manager 110 can query a system for system host information. In other embodiments, distributed process manager 110 can, in response to a system joining or otherwise connecting to distributed process manager 110, can automatically receive system information (e.g., system host, broadcast addresses, cluster IDs, nodes, etc.) from a system after the system connects.

In step 204, distributed process manager 110 processes information manager kernel thread. In this embodiment distributed process manager 110 processes the information manager kernel thread using a cluster model with formed distance using an association rule model. For example, distributed process manager 110 can send processing information changes, receive remote process change information, and record each query request as discussed in greater detail below.

In this embodiment, distributed process manager 110 sends process information changes to the broadcast address when the local host processes information changes in an initial default interval time. Distributed process manager 110 can then receive remote process change information from the broadcast address and process the received information based on the type of process information. In this embodiment, the type of process information can refer to process update information or a process management message (e.g., signaling, modifying, thread priority, cancelling a thread, etc.). In this embodiment, distributed process manager 110 sends process information to a "process information queue" in response to determining that the received process information is a remote process update. In instances where distributed process manager 110 determines that the process information includes a process management message, distributed process manager 110 sends the process management message to the local machine to the specified process or forwards to the kernel's original process management thread.

Distributed process manager 110 can then record each query request and frequency using the created, generic process identifier. In this embodiment, distributed process manager 110 records each query request as HID X→HID Y and frequency regardless of the origin of the request. In other words, distributed process manager 110 can record each query request and is not limited to any specific user operation (e.g., "ps-e|grep HID1"), and then reassign the Cluster ID for each received request.

Distributed process manager 110 can build an association rule model using the received information (i.e., the received query data). Distributed process manager 110 can then use that to define the distance between each node, represented as X and Y as expressed by Formula 1, below:

$$DX, Y = 1/\text{Support}(X, Y)$$

if there is no association between X and Y, distributed process manager 110 assumes the value is infinity.

Distributed process manager 110 can build a cluster model using the calculated distance. In this embodiment, each node of the system belongs to one cluster. Distributed process manager 110 can reassign the cluster to a table and broadcast the update on the network. Distributed process manager 110 can iteratively perform this distance calculation and update the cluster model after a defined cycle time.

In step 206, distributed process manager 110 optimizes performance. In this embodiment, distributed process manager 110 optimizes performance using the created generic process identifier, controlling the interval for collection, and reassigning the cluster ID. In this embodiment, distributed process manager 110 controls the interval for information collection in each node by predicting frequency in the next cycle and sorting the frequency in different nodes, and update according to the clusters as discussed in greater detail with respect to FIG. 3.

Accordingly, by performing the methodology of flowchart 200, distributed process manager 110 can define union structure to manage distribute processes in different system hosts. In this manner, distributed process manager 110 creates an enhanced mechanism that can be used to acquire and monitor remote host process information in time that can predict possible operation on machine to control the process monitor interval.

For example, distributed process manager 110 can alter what a user interface displays (e.g., Table 2A, below) using the defined generic process identifier and can operate processes on another node when using the defined generic process identifier (GPID).

TABLE 2A

| User Interface [root@frcn011 ps] # ps -e | | | |
|---|---|---|---|
| PID | TTY | TIME | CMD |
| | | . . . | |
| 100000000831 | ? | 00:09:45 | falcon-sensor |
| 100100000828 | ? | 00:09:45 | falcon-sensor |
| 100000000857 | ? | 00:00:02 | rpcbind |
| 100000000861 | ? | 00:00:02 | rpcbind |
| 100000000862 | ? | 00:00:40 | auditd |
| 100000000864 | ? | 00:00:24 | sedispatch |
| 100000000882 | ? | 00:00:00 | rpciod |

Specifically, the user can use the following command (e.g., ps-e) to list all processes in this cluster as shown below in Table 2B.

TABLE 2B

| gpidconverter user interface [root@frcn011 ps] # ps -e |gpidconverter | | | | |
|---|---|---|---|---|
| PID | TTY | TIME | CMD | HOST |
| | | . . . | | |
| 831 | ? | 00:09:45 | falcon-sensor | host000 |
| 828 | ? | 00:09:45 | falcon-sensor | host001 |
| 857 | ? | 00:00:02 | rpcbind | host000 |
| 861 | ? | 00:00:02 | rpcbind | host001 |
| 862 | ? | 00:00:40 | auditd | host000 |
| 864 | ? | 00:00:24 | sedispatch | host000 |
| 100000000882 | ? | 00:00:00 | rpciod | host000 |

In this manner, a user using distributed process manager 110 can utilize the generic process identifier to identify or otherwise filter and generate a list of a plurality of hosts belonging to the same group (e.g., using the command "ps-e" results in the generation of Table 2B to show the process identifier (PID) and the respective hosts). Users can then enter the following command, "|grep XX" to query specific host processes.

FIG. 3 is a flowchart 300 depicting operational steps depicting operational steps for optimizing performance utilizing a union structure, in accordance with an embodiment of the present invention.

In step 302, distributed process manager 110 predicts frequency of cycles. In this embodiment, distributed process manager 110 initially relies on the frequency defined in each cycle time of step 204 in flowchart 200. Distributed process manager 110 recognizes there are multiple frequencies in different cycles and as such, in this embodiment, predicts frequency by building a time series based on a combination of query from one node to another node and a change rate from the one node to another node. In this embodiment, distributed process manager 110 builds a time series model using a combination of machine learning and artificial intelligence algorithms.

In step 304, distributed process manager 110 sorts frequency of intervals. In this embodiment, distributed process manager 110 sorts the frequency in different modes and map broadcasts interval from its maximum value to minimum value. For example, a user can set the maximum value to twenty seconds to three seconds. Distributed process manager 110 can then recognize that the node that has the largest frequency uses the interval of three seconds and the node which has the least frequency will use the twenty second interval to send the signal to broadcast. In this embodiment, the interval update will process when dynamic process manager 110 reassigns the cluster ID based on the time series results.

In step 306, distributed process manager 110 updates processes. In this embodiment, distributed process manager 110 updates processes according to the generic process identifier. For example, after one interval for each node a broadcast occurs. Distributed process manager 110 can receive the information (e.g., when one node received the information from the other nodes), determine whether the received information is in the same cluster and then update the local system (e.g., update the local procfs). In response to determining that the received information is not in the same cluster, distributed process manager 110 can ignore the received information in favor for increasing performance. In certain instances where a user may want to manage processes which is not in the same cluster, embodiments of the present invention provide mechanisms for a user to perform a manual override to enforce an update operation.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code involved in performing the inventive methods, such as distributed process manager 110 (also referred to as block 110) manages distributed processing systems using a union structure and machine learning to control the interval of information collection in each node, as discussed previously with respect to FIGS. 2-3.

In addition to block 110, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 110, as identified above), peripheral device set 414 (including user interface (UI), device set 423, storage 424, and Internet of Things (IoT) sensor set 425), and network module 415. Remote server 404 includes remote database 430. Public cloud 605 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 110 in persistent storage 413.

COMMUNICATION FABRIC 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface type operating systems that employ a kernel. The code included in block 110 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 624 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401) and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

What is claimed is:

1. A computer-implemented method comprising:
improving broadcast performance of a system comprising a plurality of nodes by defining additional system parameters to a kernel using a union structure, wherein each node of the plurality of nodes comprises a physical device that can be monitored from other nodes within the system;
processing an information manager kernel using a cluster model using a formed distance comprising an association based on query data received between one node of the plurality of nodes and another node of the plurality of nodes; and
controlling an interval for information collection and sorting frequency for each node of the plurality of nodes in the system.

2. The computer-implemented method of claim 1, wherein the union structure is a generic process identifier that includes a cluster identifier, a host identifier, and a process identifier.

3. The computer-implemented method of claim 2, wherein the cluster identifier is changed to show several hosts in one group.

4. The computer-implemented method of claim 1, wherein controlling interval for information collection and sorting frequency for each node comprises:
predicting frequency using a time series based on a combination of query from a first node to a second node and a change rate from the first node to the second node.

5. The computer-implemented method of claim 1, further comprising:
in response to receiving information from one node of the plurality of nodes, determining whether the received information belongs to a same cluster.

6. The computer-implemented method of claim 5, further comprising:
in response to determining whether the received information does not belong to the same cluster, ignoring process of the received information.

7. The computer-implemented method of claim 6, further comprising:
in response to determining whether the received information belongs to the same cluster, updating a local system.

8. The computer-implemented method of claim 2, further comprising:
identifying a plurality of hosts as belonging to a same group of hosts utilizing the generic process identifier.

9. A computer program product comprising:
one or more computer readable storage media and program instructions stored on the one or more computer readable storage media, the program instructions comprising:
program instructions to improving broadcast performance of a system comprising a plurality of nodes by define additional system parameters to a kernel using a union structure, wherein each node of the plurality of nodes comprises a physical device that can be monitored from other nodes within the system;

program instructions to process an information manager kernel using a cluster model using a formed distance comprising an association based on query data received between one node of the plurality of nodes and another node of the plurality of nodes; and program instructions to control an interval for information collection and sorting frequency for each node of the plurality of nodes in the system.

10. The computer program product of claim 9, wherein the union structure is a generic process identifier that includes a cluster identifier, a host identifier, and a process identifier.

11. The computer program product of claim 10, wherein the cluster identifier is changed to show several hosts in one group.

12. The computer program product of claim 9, wherein the program instructions to control interval for information collection and sorting frequency for each node comprise:

program instructions to predict frequency using a time series based on a combination of query from a first node to a second node and a change rate from the first node to the second node.

13. The computer program product of claim 9, wherein the program instructions stored on the one or more computer readable storage media further comprise:

program instructions to, in response to receiving information from one node of the plurality of nodes, determine whether the received information belongs to a same cluster.

14. The computer program product of claim 13, wherein the program instructions stored on the one or more computer readable storage media further comprise:

program instructions to, in response to determining whether the received information does not belong to the same cluster, ignore process of the received information.

15. A computer system comprising:

one or more computer processors;

one or more computer readable storage media; and program instructions stored on the one or more computer readable storage media for execution by at least one of the one or more computer processors, the program instructions comprising:

program instructions to improve broadcast performance of a system comprising a plurality of nodes by defining additional system parameters to a kernel using a union structure, wherein each node of the plurality of nodes comprises a physical device that can be monitored from other nodes within the system;

program instructions to process an information manager kernel using a cluster model using a formed distance comprising an association based on query data received between one node of the plurality of nodes and another node of the plurality of nodes; and program instructions to control an interval for information collection and sorting frequency for each node of the plurality of nodes in the system.

16. The computer system of claim 15, wherein the union structure is a generic process identifier that includes a cluster identifier, a host identifier, and a process identifier.

17. The computer system of claim 16, wherein the cluster identifier is changed to show several hosts in one group.

18. The computer system of claim 15, wherein the program instructions to control interval for information collection and sorting frequency for each node comprise:

program instructions to predict frequency using a time series based on a combination of query from a first node to a second node and a change rate from the first node to the second node.

19. The computer system of claim 15, wherein the program instructions stored on the one or more computer readable storage media further comprise:

program instructions to, in response to receiving information from one node of the plurality of nodes, determine whether the received information belongs to a same cluster.

20. The computer system of claim 19, wherein the program instructions stored on the one or more computer readable storage media further comprise:

program instructions to, in response to determining whether the received information does not belong to the same cluster, ignore process of the received information.

\* \* \* \* \*